(12) United States Patent
Laleman

(10) Patent No.: US 10,408,654 B2
(45) Date of Patent: Sep. 10, 2019

(54) HYGIENIC DISPENSER

(71) Applicants: BIIP CVBA, Diegem (BE); Dries Laleman, Lummen (BE)

(72) Inventor: Dries Laleman, Leuven (BE)

(73) Assignee: Biip cvba, Diegem (BE)

( * ) Notice: Subject to any disclaimer, the term of this patent is extended or adjusted under 35 U.S.C. 154(b) by 0 days.

(21) Appl. No.: 14/768,210

(22) PCT Filed: Feb. 14, 2014

(86) PCT No.: PCT/EP2014/052929
§ 371 (c)(1),
(2) Date: Aug. 14, 2015

(87) PCT Pub. No.: WO2014/125076
PCT Pub. Date: Aug. 21, 2014

(65) Prior Publication Data
US 2015/0377675 A1 Dec. 31, 2015

(30) Foreign Application Priority Data

Feb. 15, 2013 (EP) .................................... 13155435
Mar. 22, 2013 (EP) .................................... 13160646

(51) Int. Cl.
| | |
|---|---|
| *G01F 11/42* | (2006.01) |
| *G01F 11/26* | (2006.01) |
| *B65D 77/04* | (2006.01) |
| *B65D 83/08* | (2006.01) |
| *A47J 47/04* | (2006.01) |
| *B65D 25/02* | (2006.01) |
| *B65D 85/00* | (2006.01) |

(52) U.S. Cl.
CPC ............... *G01F 11/42* (2013.01); *A47J 47/04* (2013.01); *B65D 25/02* (2013.01); *B65D 77/0493* (2013.01); *B65D 83/0805* (2013.01); *B65D 85/70* (2013.01); *G01F 11/26* (2013.01)

(58) Field of Classification Search
CPC ..... A47J 47/04; B65D 25/02; B65D 77/0493; B65D 81/365; B65D 83/0805; B65D 85/70; G01F 11/42; G01F 11/26; G01F 11/263; G01F 3/36; A47G 19/24; D06F 39/022; D06F 39/024
See application file for complete search history.

(56) References Cited

U.S. PATENT DOCUMENTS

| | | | |
|---|---|---|---|
| 913,026 A * | 2/1909 | Meaker .................. | A47G 19/24 222/457.5 |
| 1,898,152 A * | 2/1933 | Taft ........................ | A47G 19/24 222/133 |

(Continued)

FOREIGN PATENT DOCUMENTS

| | | |
|---|---|---|
| CN | 2486575 | 4/2002 |
| CN | 2892923 | 4/2007 |

(Continued)

*Primary Examiner* — David P Angwin
*Assistant Examiner* — Bob Zadeh
(74) *Attorney, Agent, or Firm* — Levy & Grandinetti

(57) ABSTRACT

A hygienic dispenser for edible articles incorporates additional hygiene and dosing features. The dispenser comprises an inner and outer reservoir, wherein the inner reservoir is contained in the outer reservoir.

11 Claims, 3 Drawing Sheets

(56) References Cited

U.S. PATENT DOCUMENTS

| | | | | |
|---|---|---|---|---|
| 2,035,256 A | * | 3/1936 | Ball | A47G 19/34 |
| | | | | 132/315 |
| 2,136,805 A | * | 11/1938 | Scharinger | A47G 19/24 |
| | | | | 222/457.5 |
| 2,203,880 A | * | 6/1940 | Schindelbeck | A47G 19/24 |
| | | | | 222/142.4 |
| 3,046,751 A | * | 7/1962 | Gardner | F17C 9/02 |
| | | | | 114/74 A |
| 3,312,377 A | * | 4/1967 | Chuhran | A47G 19/34 |
| | | | | 222/359 |
| 3,843,120 A | * | 10/1974 | Ricci | A63D 15/006 |
| | | | | 222/142.5 |
| 4,312,390 A | * | 1/1982 | Plonski | A47G 19/34 |
| | | | | 141/360 |
| 4,776,455 A | | 10/1988 | Anderson et al. | |
| 4,828,143 A | * | 5/1989 | Jennings | B65D 83/0409 |
| | | | | 221/266 |
| 4,835,804 A | * | 6/1989 | Arnau-Munoz | D06F 39/024 |
| | | | | 206/0.5 |
| 4,874,107 A | | 10/1989 | Arnau-Munoz et al. | |
| 5,129,120 A | * | 7/1992 | Cornette | D06F 39/024 |
| | | | | 205/0.5 |
| 5,355,541 A | | 10/1994 | Rutter et al. | |
| 5,495,964 A | * | 3/1996 | Santagiuliana | G01F 11/261 |
| | | | | 222/455 |
| 5,551,604 A | | 9/1996 | Kern et al. | |
| 5,768,917 A | * | 6/1998 | Freida | D06F 39/204 |
| | | | | 206/0.5 |
| 5,944,417 A | * | 8/1999 | Shiotani | B01F 9/0018 |
| | | | | 366/220 |
| 6,116,455 A | * | 9/2000 | Rossman | B65D 81/365 |
| | | | | 220/23.83 |
| 6,736,294 B2 | | 5/2004 | Smith | |
| 6,776,315 B1 | * | 8/2004 | Laulom | A47J 43/27 |
| | | | | 141/322 |
| 7,819,347 B2 | * | 10/2010 | Antal, Sr. | G01F 11/26 |
| | | | | 222/441 |
| 8,348,084 B2 | * | 1/2013 | Dahlquist | A47G 19/02 |
| | | | | 220/23.87 |
| 9,149,808 B1 | * | 10/2015 | Smith | A45F 3/18 |
| 2006/0288600 A1 | | 12/2006 | Taylor | |
| 2007/0022971 A1 | | 2/2007 | Renforth et al. | |
| 2007/0284396 A1 | * | 12/2007 | Antal | G01F 11/26 |
| | | | | 222/438 |
| 2008/0264958 A1 | * | 10/2008 | Blake | B65D 41/56 |
| | | | | 220/703 |
| 2009/0300933 A1 | | 12/2009 | Howe et al. | |
| 2009/0307924 A1 | | 12/2009 | Aouad et al. | |
| 2011/0132781 A1 | * | 6/2011 | Willat | B65D 1/0276 |
| | | | | 206/217 |
| 2011/0163118 A1 | * | 7/2011 | Gieda | G01F 11/24 |
| | | | | 222/1 |
| 2012/0023678 A1 | | 2/2012 | Smulowitz | |
| 2014/0033447 A1 | | 2/2014 | Di Bono et al. | |
| 2015/0299933 A1 | * | 10/2015 | Oh | D06F 39/024 |
| | | | | 510/513 |
| 2015/0377675 A1 | * | 12/2015 | Laleman | B65D 77/0493 |
| | | | | 222/144.5 |
| 2016/0316976 A1 | * | 11/2016 | Schulze | A47K 10/46 |
| 2017/0101735 A1 | * | 4/2017 | Moens | D06F 39/024 |

FOREIGN PATENT DOCUMENTS

| | | |
|---|---|---|
| DE | 88 01 921 | 6/1989 |
| DE | 100 27 951 | 1/2002 |
| EP | 2 108 068 | 7/2008 |
| EP | 2 481 687 | 8/2012 |
| KR | 10-1222784 | 1/2013 |
| WO | WO 00/05144 | 2/2000 |
| WO | WO 2005/047119 | 5/2005 |
| WO | WO 2008/152362 | 12/2008 |
| WO | WO 2012/095649 | 7/2012 |

* cited by examiner

US 10,408,654 B2

HYGIENIC DISPENSER

This Application is the U.S. National Phase of International Application Number PCT/EP2014/052929 filed on Feb. 14, 2014, which claims priority to EP 13160646.9 filed on Mar. 22, 2013, and EP 13155435.4 filed on Feb. 15, 2013.

FIELD OF THE INVENTION

The present invention concerns a hygienic dispenser for edible articles which incorporates additional hygiene and dosing features.

BACKGROUND OF THE INVENTION

All sort of packages are widely spread in the market around the world, made from any range of material and size. There are even examples wherein the packages themselves can be used as some kind of dispensing container, especially in the food package industry.

The problem is that most of these containers are some sort of bags or bowls, where the consumer has to reach in with his hand to grab the food. If the package is shared with different persons this can cause hygiene issues.

This becomes a growing problem in the globalist world we live in today, wherein epidemics are widespread (e.g. SARS). These diseases can rapidly spread geographically, infecting large numbers of people. In this view, cleanliness and hygiene have become an important attention point in public areas, especially if food articles are involved.

In document U.S. Pat. No. 5,551,604 a relatively hygienic dispenser is described, for dispensing bulk foods like gum drops or nuts. It comprises a rotatable scoop attached to a storage bin. This makes the dispenser bulky and less flexible.

Document US2007022971 describes a substance dispensing pet-toy. It comprises an inner chamber and dispensing openings placed on opposites of each other. The document however does not describe different reservoirs which are desired for hygienic dispensing.

In document WO2005/047119 describes a container comprising an exterior form with an interior compartment; it however is intended as a toy and does not mention any hygienic features.

Furthermore there is need for a flexible and easy dosable dispenser. Also a dispenser suitable for design branding and making more recognizable on-trade applications for bars, hotels and restaurants.

In order to address the aforementioned problems, it is clear that there remains a need for more efficient food packages/dispensers.

SUMMARY OF THE INVENTION

The present invention addresses this problem by providing a device for the easy and clean dispensing of all kinds of edible articles. A device used for packaging and dispensing edible articles comprising at least two reservoirs:
  a) An inner reservoir suitable for storing edible articles comprising at least one opening
  b) An outer reservoir comprising at least one opening characterised in that said inner reservoir is contained in the outer reservoir, wherein the openings of both reservoirs are placed on opposite sides.

BRIEF DESCRIPTION OF THE INVENTION

The present invention describes a dispensing device which incorporates two reservoirs, one contained in the other one. Hereby providing a dispenser where only the edible articles meant for immediate personal consumption are touched. This provides a big improvement concerning hygienic issues.

Also the original 'twist' movement needed for dispensing the edible articles adds to the fun factor and makes the invention even more recognizable for consumers.

DETAILED DESCRIPTION OF THE INVENTION

The present invention comprises a dispenser with at least two reservoirs: A first inner reservoir 5 with a cylindrical hollow shaped reservoir with an opening 6 on top in which the edible goods can be stored/packed. A second outer hollow reservoir contains the inner reservoir comprising a bottom dispensing opening 7 on the opposite side of the top opening 6 of the inner reservoir.

Another feature of the present invention is the 'twist' action. The action comprises two steps after filling the dispenser with edible goods. The dispenser first needs to be turned upside down to release the edible goods from the inner reservoir. The edible goods are now contained in the outer reservoir. In the next step the dispenser can be turned back to the original position to dispense the articles through the dispensing opening on the bottom. This feature provides a hygienic improvement, when sharing the dispenser with other people for example in bars and restaurants.

The inner reservoir is used to hold the edible articles. This can be one or more edible goods e.g. nuts, crackers, potato chips and mixtures thereof. The edible articles may also comprise spices and/or other cooking related goods. The inner reservoir can also comprise several compartments, to make the dispenser more flexible and hold different contents (e.g. salt and pepper). Example is in one compartment unsalted peanuts and in a further compartment salt or other spices can be separately dosed.

Figure 1:
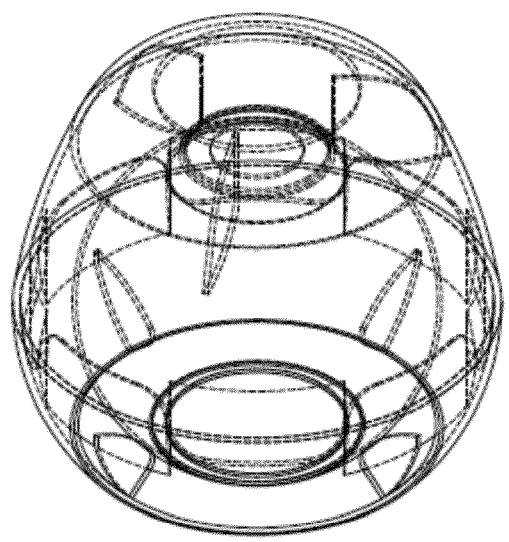
FIG. 1: The reservoirs of the dispenser shown according to the present invention.
Figure 2:
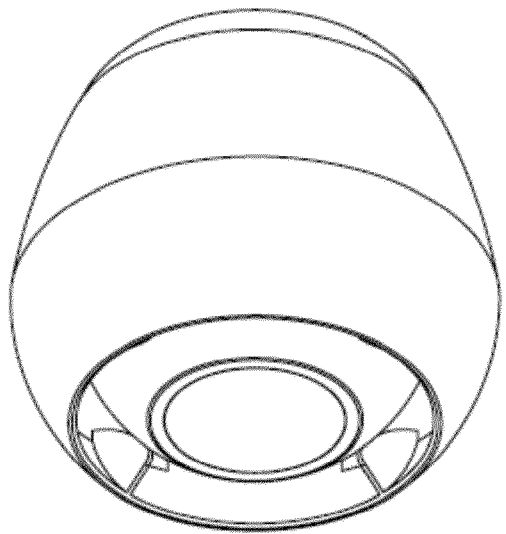
FIG. 2: The dispenser according to the present invention.

In a preferred embodiment as seen in FIGS. 1 & 2 the inner reservoir will take the form of a sphere having a diameter ranging from 55 mm to 85 mm, with at least one top opening with a diameter ranging from 10 mm to 50 mm. The inner reservoir can comprise multiple openings depending on the application. This top opening(s) can further segmented in line with the application and resulting dosages envisaged. The segmentation itself can be the result of the compartisation of the inner reservoir itself. In case the inner reservoir takes the form of a sphere the outer reservoir can also take the form of a sphere with a diameter ranging from 65 mm to 105 mm to be able to contain the inner reservoir. The diameter of the opening on the bottom of the outer reservoir ranges from 60 mm to 95 mm. These dimensions are chosen to ensure the dispenser to be handy, have a handy grip and making dosing and adapted to the volume and type of dispensing medium.

The outer reservoir preferably comprises two parts: an upper and bottom part. This is done to be able to open the dispenser easily and (re)fill the inner reservoir with edible articles. The upper and bottom part are preferably engaged to each other fixing means. Such fixing means include snap fittings, connectors, a connecting rim or the like. These fixing means should allow the upper and bottom part to be revolved easily. The inner reservoir that is contained in the outer reservoir can be manufactured in one piece together with the bottom part of the outer reservoir. The inner reservoir can also be manufactured as a package, so when empty the entire inner reservoir can be changed for a full/new inner reservoir/package. The two outer parts can comprise fixing means such as fins, securing the inner reservoir within the outer reservoir. These fixing means may also guide the edible articles towards the bottom opening of the bottom part.

Figure 3:
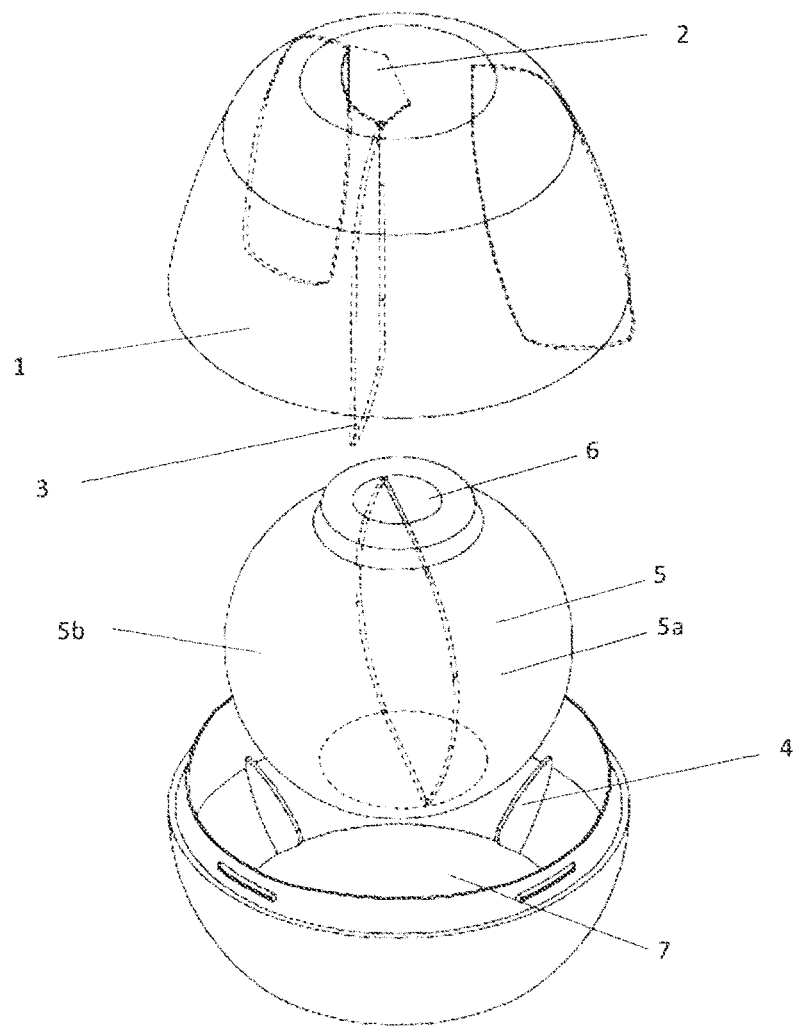
FIG. 3: An exploded view of a possible embodiment of the present invention.

When the inner reservoir 5 comprises one or more compartments 5a 5b as shown in FIG. 3, the upper part 1 of the outer reservoir can be provided with means for selecting a specified compartment 2, by making a revolving movement, this to only dispense a selected edible article.

In further improving the dosage feature the bottom opening of the outer reservoir can also be provided with an adjustable dosing means. This can be in the form of a revolving attachment, to vary the size of the opening. In FIG. 3 it is shown that also guiding fins 3 can be used to vary the bottom opening for dosing. These guiding fins 3 are adjustable by turning the upper part of outer reservoir, hereby displacing the guiding fins of the upper part of the outer reservoir in respect to the guiding fins of the bottom part 4 of the outer reservoir and hereby varying the opening where articles are to pass through. The amount of guiding fins can vary as the dimensions of the dispenser change or the embodiment changes. Other means of varying the opening can also be used.

Other attachments with all kinds of functions can also be connected to bottom opening of the outer reservoir. Such attachments may include further dosage means, grinding means, cutting means or the like.

Figure 4:
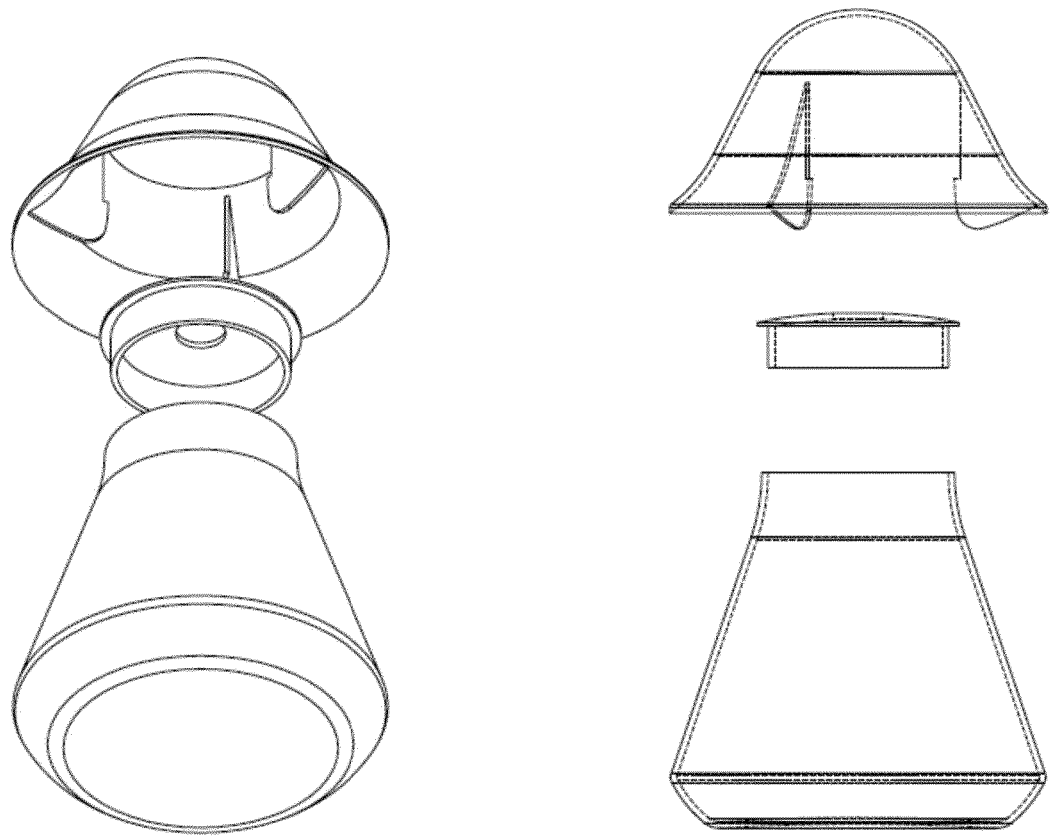
FIG. 4: A perspective view of a possible embodiment of the invention.
Figure 5:
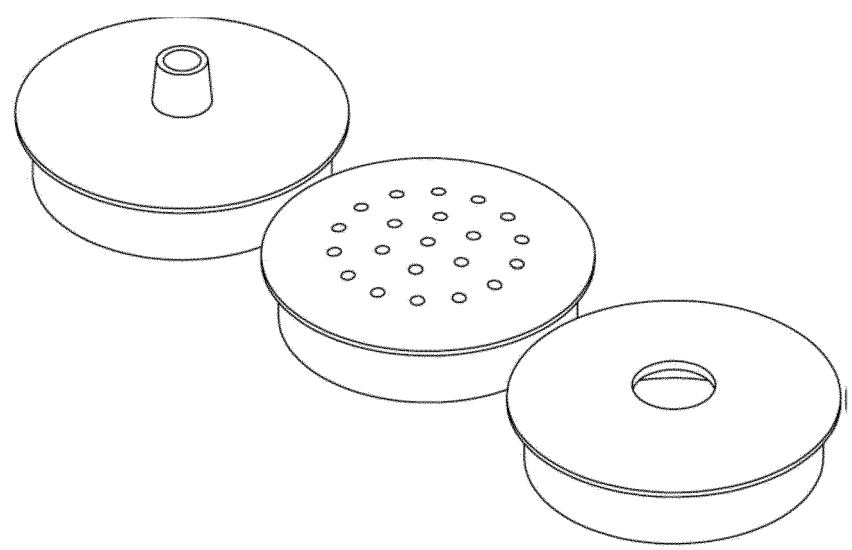
FIG. 5: Examples of possible lids for the embodiment.

In another preferred embodiment of the present invention as seen in FIG. 4. The outer reservoir can partially cover the inner reservoir. This embodiment can be used in kitchens for dosing liquids like all sorts of oils and vinegars, also for holding and dosing spices. To this cause the inner reservoir is provided with a lid. This lid is interchangeable and the shape can vary depending on the content as seen in FIG. 5.

The present invention is preferably made from a polymer. This can be any kind of polymer like polyethylene, polypropylene, polyethylene terephthalate, polycarbonate or the like. Even biodegradable polymers can be used. The dispenser can have transparent parts or be transparent entirely.

The dispenser may include other decorative designs, words or brand names. Alternate embodiments may be shaped like a variety of other objects.

The aforesaid objects are achieved individually and in combination, and it is not intended that the present invention be construed as requiring two or more of the objects to be combined unless expressly required by the claims attached hereto.

The invention claimed is:

1. A device used for packaging and dispensing edible articles comprising at least:
    (a) a hollow shaped spherical inner reservoir which stores the edible articles comprising at least one opening;
    (b) a spherical shaped outer reservoir comprising at least one opening; and
    the inner reservoir being contained in the outer reservoir, the outer reservoir comprises an upper part and a bottom part, the upper part and the bottom part are engaged to each other by fins, the fins secure the inner reservoir within the outer reservoir and allow the upper part and the bottom part to revolve, the fins guide the edible articles towards the opening; and
    in a normal orientation of the device, the at least one opening of the inner reservoir is a top opening, the at least one opening of the outer reservoir is a bottom dispensing opening on the opposite side of the top opening of the inner reservoir, and the edible articles are released from the inner reservoir via the top opening into the outer reservoir when turning the device upside down from the normal orientation, and released from the outer reservoir via the bottom dispensing opening when turning the device back to the normal orientation.

2. The device according to claim 1, wherein the outer reservoir is configured to deliver variable size dosages.

3. The device according to claim 1, wherein the inner reservoir is interchangeable.

4. The device according to claim 1, wherein the inner reservoir contains the edible articles or spices.

5. The device according to claim 1, wherein the reservoirs are manufactured from a polymeric material.

6. The device according to claim 1, wherein the diameter of the inner reservoir ranges between 55 mm and 85 mm.

7. The device according to claim 1, wherein the diameter of the outer reservoir ranges between 65 mm and 105 mm.

8. The device according to claim 1, further comprising a grinder.

9. A device used for packaging and dispensing edible articles comprising:
    (a) a hollow shaped spherical inner reservoir which stores the edible articles comprising at least one opening, the diameter of the inner reservoir ranges between 55 mm and 85 mm;
    (b) a spherical shaped outer reservoir comprising at least one opening, the diameter of the outer reservoir ranges between 65 mm and 105 mm;
    the inner reservoir being contained in the outer reservoir, the outer reservoir comprises an upper part and a bottom part, the upper part and the bottom part are engaged to each other by fins, the fins secure the inner reservoir within the outer reservoir and allow the upper part and the bottom part to revolve, the fins guide the edible articles towards the opening;
    in the normal orientation, the at least one opening of the inner reservoir is a top opening, the top opening being of a size sufficient for a bite-size edible article to pass;
    the at least one opening of the outer reservoir is a bottom dispensing opening on the opposite side of the top opening of the inner reservoir, the bottom dispensing opening being of a size sufficient for a bite-size edible article to pass; and
    the bite-size edible articles are released from the inner reservoir via the top opening into the outer reservoir when turning the device upside down from the normal orientation, and released from the outer reservoir via the bottom dispensing opening when turning the device back to the normal orientation, wherein multiple users can hygienically self-dispense one or more bite-size edible articles to themselves while being prevented from contacting non-dispensed bite-size edible articles packaged in the inner reservoir of the device.

10. The device used for packaging and dispensing edible articles of claim 9 wherein the edible articles comprise a bite-size edible article being a member selected from the group consisting of nuts, crackers, potato chips, and mixtures thereof.

11. The device used for packaging and dispensing edible articles of claim 9, further comprising a grinder.

* * * * *